May 31, 1949. N. W. BRYANT 2,471,516
PLAN POSITION INDICATING SYSTEM AND METHOD
Filed Dec. 20, 1941 3 Sheets-Sheet 1
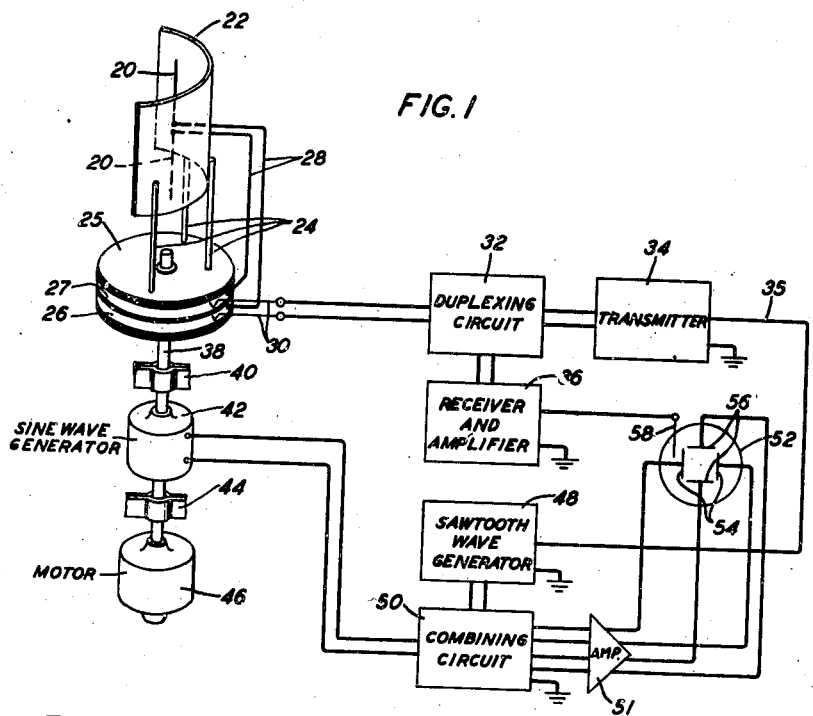
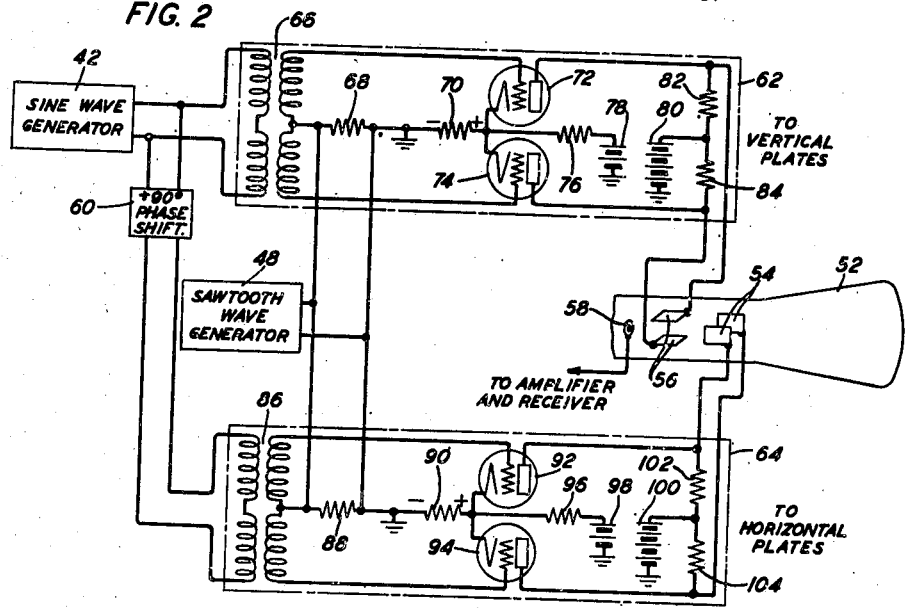
INVENTOR
N. W. BRYANT
BY H. O. Wright
ATTORNEY May 31, 1949. N. W. BRYANT 2,471,516
PLAN POSITION INDICATING SYSTEM AND METHOD
Filed Dec. 20, 1941 3 Sheets-Sheet 2
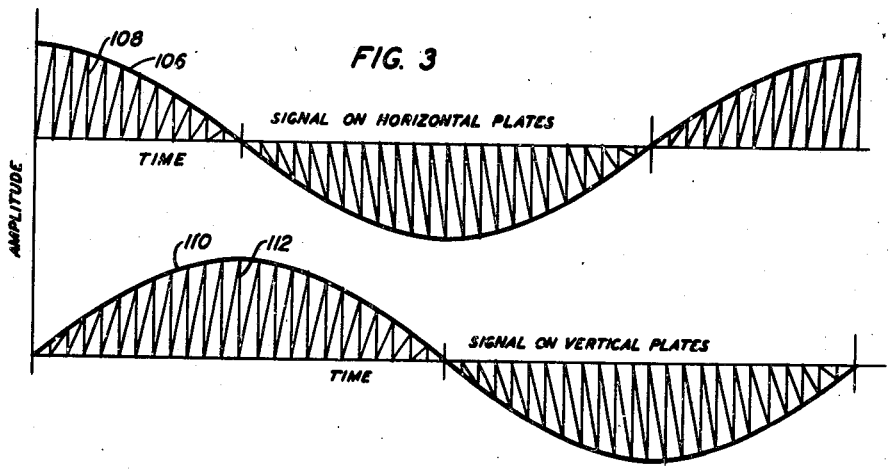
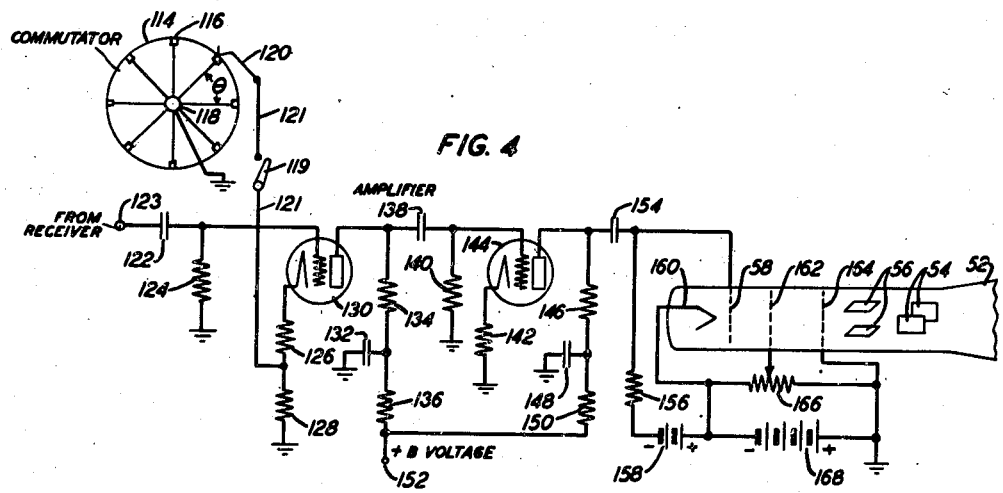
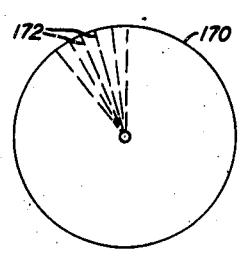
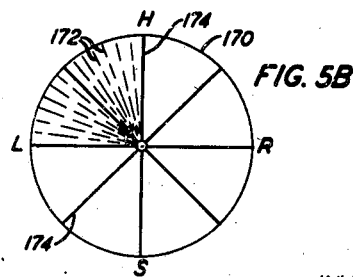
INVENTOR
N. W. BRYANT
BY H. O. Wright
ATTORNEY May 31, 1949.  N. W. BRYANT  2,471,516
PLAN POSITION INDICATING SYSTEM AND METHOD
Filed Dec. 20, 1941  3 Sheets-Sheet 3
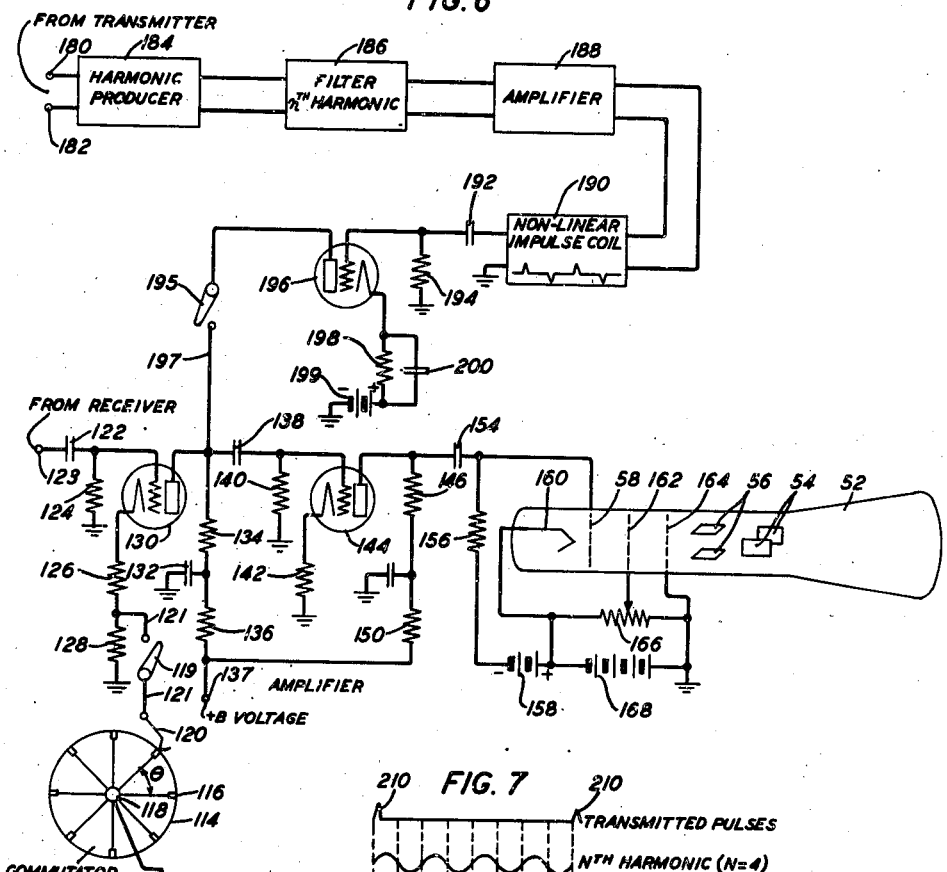
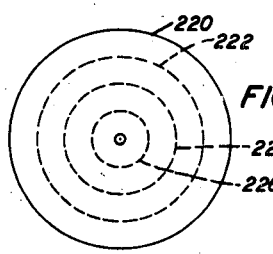
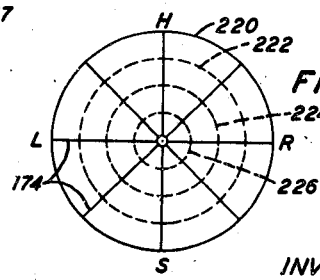
INVENTOR
N. W. BRYANT
BY H. O. Wright
ATTORNEY Patented May 31, 1949

2,471,516

UNITED STATES PATENT OFFICE 2,471,516

PLAN POSITION INDICATING SYSTEM AND METHOD

Newton W. Bryant, Chatham, N. J., assignor to Bell Telephone Laboratories, Incorporated, New York, N. Y., a corporation of New York Application December 20, 1941, Serial No. 423,757

5 Claims. (Cl. 343—11)

This invention relates to an improved method and apparatus for providing plan position indications. More particularly it relates to a method of and apparatus for scanning an area from a reference point within the area and presenting a plan position indication of all objects within the area, that is, presenting a plan view of the area surrounding a reference point with each object shown thereon so that its azimuth angle with respect to and its distance from the reference point are directly indicated thereon.

Systems embodying the principles of the invention are particularly well adapted for use as aids to the navigation of marine vessels since they show at a glance all objects within a radius equal to the range of the system (systems with ranges of 20 or more miles are entirely practicable in the present state of the art), the distances to each object shown and the direction or azimuth angle of each object with respect to the point at which the observing ship is located.

The navigator of the ship can therefore in fog and darkness readily avoid collisions with other vessels and maintain a particular desired course with respect to fixed landmarks, when within range of land, and with respect to other ships in crowded sea lanes.

Systems of the invention may also be used to advantage at fixed points such, for example, as at harbor entrances and headlands to observe the relative positions and courses of marine craft in the neighborhood when visibility is poor, so that craft not equipped with adequate safeguards may be warned of obstacles and other craft with which they might otherwise collide.

Systems of the invention can also obviously be adapted for use in the navigation of aircraft.

The simplest form of illustrative embodiment of the principles of the invention comprises a beam antenna which is sharply directive in the horizontal plane (but preferably somewhat broader in the vertical plane to compensate for the roll of the vessel in heavy seas), means for rotating the antenna beam about a vertical axis so that the beam will scan the full 360 degrees of the horizon, means for energizing the antenna to emit radio energy, means for receiving reflections of said emitted energy from objects upon which the beam impinges, means for determining the distance to each reflecting object and means for constructing from the directional (azimuth angle) and distance indications thus obtained a plan position indication visually representing each and every reflecting object and its distance and azimuth angle with respect to the point of observation. The last-mentioned means, in a preferred form, comprises a cathode ray oscilloscope having horizontal and vertical deflecting plates and a control electrode or "grid," and the system then includes means for supplying voltages to the deflecting plates such that the beam of the oscilloscope will rotate about the center of the target in synchronism with the rotating beam antenna while at the same time scanning the target radially from the center to the periphery of the target. The received reflected waves then actuate means for altering the potential of the aforementioned control electrode or grid to cause intensity modulation of the beam. The sweep as actually employed is not precisely radial, since the spot is rotating at the same time, but with a relatively high pulse rate, as compared to the rate of antenna rotation, the sweep approaches a substantially radial sweep.

In the illustrative embodiment to be described, distance is measured by the well-known pulse reflection method, the "radial" sweeping motion being synchronized to leave the oscilloscope target center as each pulse is emited and to reach the periphery at a time corresponding to that required for reception of reflections from objects at the maximum range of the system. Reflections from intermediate objects will therefore result in intensity modulations of the ray which occur intermediate the center and periphery of the target, the radial distances of such modulations from the center being proportional to the actual distances of the respective objects and the radial angles being the same as the azimuth angles of the respective reflecting objects with respect to the point of observation. The azimuth angles observed are slightly in error due to the fact that the sweep is not precisely radial. The error is proportional to the range of the respective objects, for any given pulse rate. The error is also inversely proportional to the pulse rate. For high accuracy the pulse rate can be made high, but this limits the range. For practical purposes, however, the sweep can be considered as radial, with an accuracy in the order of ±1 degree. Alternatively, distance can be measured by the frequency modulation method described, for example, in the copending application of L. Espenschied and J. G. Chaffee, Serial No. 353,902, filed August 23, 1940. Obviously, also, for systems of relatively short range compressional waves can be employed in place of electromagnetic waves.

The primary object of the invention, accordingly, is to provide a system which will scan the entire horizon about a marine craft, a fixed observation point or an aircraft and present an integral visual representation of the respective azimuth angles and distances of other craft or of obstacles within the area scanned.

Another object is to provide a system of the above-mentioned character in which a simple electrostatic deflection type of cathode ray oscilloscope may be conveniently employed to provide the desired visual plan position indications.

Other objects, as will subsequently appear, are to provide radial and concentric reference lines on the target of the cathode ray oscilloscope by electrical means to facilitate the interpretation of the pattern of signals obtained.

Additional objects will become apparent during the course of the following description and in the appended claims.

The principles of the invention will be more readily understood from the following description of illustrative embodiments thereof, taken in conjunction with the accompanying drawings in which:

Fig. 1 indicates in block diagrammatic form an illustrative system of the invention;

Fig. 2 shows in schematic form an electrical circuit providing combined rotary and radial sweeping of the cathode ray oscillograph target;

Fig. 3 illustrates the combinations of sine and sawtooth wave deflecting voltages applied to the horizontal and vertical deflecting plates of the oscilloscope of Fig. 2;

Fig. 4 illustrates in schematic form one means for providing definitely positioned radial calibration marks on the target of a cathode ray oscilloscope for systems of the invention;

Figs. 5A and 5B illustrate radial scanning and the application of radial calibration marks on an oscillograph target;

Fig. 6 illustrates in schematic form one means for providing a plurality of definitely positioned concentric circular calibration marks on the target of a cathode ray oscilloscope for systems of the invention;

Fig. 7 is a diagram employed in explaining the operation of the arrangement of Fig. 6;

Fig. 8A illustrates the application of concentric circular calibration marks on an oscillograph target; and Fig. 8B illustrates the application of both radial and concentric circular calibration marks on an oscillograph target.

In more detail, in Fig. 1, a dipole antenna 20 is positioned on the focal line of the curved sheet reflector 22. Reflector 22 is preferably of copper or other highly conductive material and of substantially parabolic shape in its horizontal cross section. Conductors 28 connect electrically to the halves of dipole 20 and can assist in the mechanical support of the dipole in its proper position with respect to reflector 22. At least one of the conductors 28 and its associated antenna element must, of course, be electrically insulated from the reflector. A base 25, of insulating material, carries slip-rings 26 and 27 which are of conductive material, but are insulated from each other. Reflector 22 is supported on base 25 by members 24. Base 25 is mounted on vertical rotatable shaft 38. The focal axis of reflector 22 is preferably maintained by the above-mentioned structure, in alignment with the longitudinal axis of vertical shaft 38. Shaft 38 is supported in bearings 40 and 44 and has connected thereto in addition to the aforementioned base 25, the rotors of sine wave generator 42 and motor 46. The lower ends of leads 28 make electrical connection to slip-rings 26 and 27, respectively. Brushes 30 ride on slip-rings 26 and 27 and are electrically connected to duplexing circuit 32.

Duplexing circuit 32, as its name implies, permits the use of a single antenna structure for both transmission and reception. It may take any of the several forms well-known to the art. Its functions are, of course, to prevent any substantial loss of transmitting energy in the receiver circuit or loss of received energy in the transmitter circuit and to prevent the overloading and blocking of the receiver by energy from the transmitter. These functions are usually achieved in the well-known arrangements of the art by adding discrete portions of transmission lines to the transmitter and receiver input circuits such that the transmitter and receiver circuits each present a high impedance to energy of the other circuit, respectively, the receiver input circuit usually including, in systems of the pulse reflection type, a voltage operated device which effectively blocks the receiver input circuit to the high level transmitted energy but unblocks the receiver input circuit to the low level received energy immediately after the transmitter has finished transmitting an energy pulse. A duplexing arrangement for a system employing the frequency modulation method of distance determination is shown, for example, in Patent 2,045,071 issued June 23, 1936, to L. Espenschied.

Transmitter 34, for the preferred illustrative embodiment of this invention, is arranged in accordance with any of the well-known methods of the art to emit short pulses of ultra-high frequency energy, the pulses being uniformly spaced with respect to time at intervals sufficient to permit reflections of any particular pulse from an object at the maximum range of the system to be received before the next successive pulse is emitted.

Receiver and amplifier 36 is of conventional design, arranged by the reduction of the time constants of its coupling circuits to recover rapidly from possible overloading. Received reflected pulses are demodulated, amplified and applied to control grid 58 of cathode ray oscillograph 52 to cause intensity modulation of the electron beam thereof, upon receipt of each respective reflected pulse.

Sine wave generator 42 and saw-tooth wave generator 48 supply their respective voltages to combining circuit 50 the output circuits of which, after passing through a suitable amplifier 51, provide deflecting voltages to the horizontal deflecting plates 54 and the vertical deflecting plates 56 of the cathode ray oscilloscope 52 causing the electron beam thereof to scan the target of the beam radially and at the same time to turn about the center of its target in synchronism with the rotation of the antenna structure. For the arrangement illustrated in Fig. 1 sine wave generator 42 produces a sine wave in synchronism with the antenna rotation and the saw-tooth wave generator 48 can be triggered by energy from the pulses generated in transmitter 34 and reaching generator 48 through conductor 35.

The detailed arrangement of a preferred form of the combining circuit 50 is shown in Fig. 2, its connections to the sine wave and saw-tooth wave generators 42 and 48 and to the deflecting plates of cathode ray oscillograph 52 also being shown. The combining circuit as shown in Fig. 2 comprises two conjugate input balanced modulators 62 and 64 and a 90-degree phase shifting network 60. Energy from sine wave generator 42 is introduced directly into the primary of transformer 66 but is passed through phase shifting network 60 before being introduced into transformer 86. Alternatively, a two phase sine wave generator could be employed and the two phases could then be applied to transformers 66 and 86, respectively, without employing a phase shifter.

Energy from saw-tooth wave generator 48 is introduced into the common branches of both balanced modulators 62 and 64, i. e., across resistance 68 of modulator 62 and resistance 88 of modulator 64, respectively. Resistances 70 and 76 and battery 78, resistances 90 and 96 and battery 98 in the common cathode branches of the respective modulators 62 and 64 provide suitable voltage drops to provide appropriate grid bias for the vacuum tubes 72 and 74 and 92 and 94, respectively. The tubes should be chosen and biased to have a substantially linear variation of mutual conductance over their normal operating range in the system. They should be operated as class B amplifiers, that is, the grid bias should be chosen so that the tubes are at or near cut-off if the sine wave and saw-tooth signals are cut off. The signal in the plate circuit of each tube will then be a half period of a sine wave so as to reproduce in their common push-pull connected pate circuit the sine wave of generator 42 without appreciable distortion. Batteries 80 and 100 provide appropriate plate voltage for the modulators 62 and 64, respectively, and resistors 82 and 84, and 102 and 104, respectively, provide suitable plate circuit loads.

Across resistors 82 and 84 the sine wave of generator 42 modulated by the saw-tooth wave of generator 48 will then be obtained as illustrated by wave 108 of Fig. 3, wave 106 representing the envelope of the modulated wave. Across resistors 102 and 104 a similar modulated wave 112 of Fig. 3 will be obtained but it will be displaced 90 degrees with respect to wave 108 as a result of the insertion of network 60 between modulator 64 and generator 42. Wave 110 of Fig. 3 is of course the envelope of modulated wave 112.

With wave 108 suitably amplified in amplifier 51 and applied to one set of deflecting plates 56 and wave 112 suitably amplified in amplifier 51 and applied to the other set of deflecting plates 54 of cathode ray oscillograph 52 the electron beam of the tube will be caused to scan the target of the oscillograph in a substantially radial manner from the center, the beam rotating in synchronism with sine wave generator 42 which, as described in connection with Fig. 1, is on the same shaft and hence is rotated in synchronism with the antenna structure.

Obviously sine wave generator 42 could be replaced by a sine wave oscillator, the oscillations of which are appropriately synchronized with the rotation of the antenna structure. A number of other arrangements and apparatus combinations equivalent to those shown and described in connection with Fig. 1 will readily occur to those skilled in the art.

Fig. 5A represents a number of successive radial scanning paths 172 of the electron beam over the target 170 of a cathode ray oscillograph as employed in a system of the invention.

In order to facilitate determination of the azimuth angle of a particular indication, it is obviously desirable to have definitely placed radial calibrating lines appear on the target such, for example, as lines 174 of Fig. 5B in which, for example, H may represent the direction in which the craft is heading, S may represent the astern direction and R and L may represent the right and left normals, respectively, to the H-S axis, etc. Alternatively, the compass directions north, south, east and west can conveniently be used particularly as fixed observation points and even on mobile craft if the wave applied to the modulators is shifted in phase by an amount equal to the bearing angle of the ship. This can obviously be done by a mechanical connection to a compass, of a suitable phase shifter. Probably for most applications on mobile craft, however, the above described arrangement employing the designations H, S, R and L is more desirable.

One convenient arrangement for providing radial calibration lines is shown in Fig. 4 in which a commutator 114 having conducting segments 116 all of which are connected to a grounded central hub 118. Commutator 114 is rotated in synchronism with the sine wave generator 42 of Figs. 1 and 2 and is related thereto so that contact spring 120 will make contact with one of the segments 116 for each of a plurality of predetermined azimuth directions of the exploratory beam such, for example, as are indicated in connection with Fig. 5B, as described above.

As shown in Fig. 4, the grounding of contact spring 120 may change the bias of one stage of the amplifier by shorting out a resistor 128 in the cathode-grid circuit of vacuum tube 130 and thus cause an intensity modulation of the electron beam of the cathode ray oscillograph 52 in a manner well known in the art. A single-pole single-throw switch 119 is preferably inserted in lead 121 so that the calibration marks can be removed when not desired. In Fig. 4 a suitable form of amplifier of conventional type is shown in detail, the condensers 122, 132, 138, 148, 154, and resistances 124, 126, 128, 134, 136, 140, 142, 146, 150 and 156 providing suitable coupling circuits between the receiver and amplifier, between the two amplifier vacuum tubes 130 and 144 and between the amplifier and the cathode ray tube, as indicated. Batteries 158 and 168 and potentiometer 166 provide suitable biases for operation of the cathode ray tube in accordance with the conventional use of the tube as is well known in the art.

To facilitate the estimation of the distance of a particular indication the invention provides for obtaining a second set of calibration marks in the form of concentric circles at predetermined distances from the center of the cathode ray oscillograph target. By way of example, if the extreme range of the system be 20 miles, then concentric circles placed at ¼, ½ and ¾ of the radius from the center will indicate distances of 5, 10 and 15 miles, respectively, and an indication occurring between the second and third of these circles, for example, will be at a distance between 10 and 15 miles and its exact distance can be estimated with a higher degree of accuracy than if no distance calibration makes were furnished.

Figs. 6, 7 and 8A illustrate a preferred method of modification of the system of Figs. 1 and 2 to provide quarterly, distance calibration marks in the form of concentric circles.

In Fig. 6 harmonic producer 184 is coupled to the transmitter to obtain a small amount of the pulse energy of the transmitter, represented by pulses 210 of Fig. 7. This coupling should, of course, be electrically loose so that only a small amount of energy is thus absorbed and the effective radiated energy is not substantially reduced.

Harmonic producer 184 produces, as its name implies, harmonics of the pulsing frequency and filter 186 is designed in accordance with well-known filter theory to pass a particular harmonic (in this instance the fourth harmonic is desired, curve 212 of Fig. 7) and to suppress all others. Amplifier 188 amplifies the selected (fourth) harmonic and supplies it to the non-linear impulse coil circuit 190. This circuit may be of any of the types well-known to the art as, for example, that shown in United States patent to L. R. Wrathall 2,117,752, issued May 17, 1938. It generates a series of positive and negative pulses 216 and 214 of Fig. 7.

Circuit 190 is coupled to vacuum tube 196 through the coupling circuit which includes resistors 194 and 198, capacity 192, capacity 200 and bias battery 199. Tube 196 is biased beyond cut-off by battery 199 so that only negative pulses 215 of Fig. 7 appear in the output of the tube.

The output of tube 196 is introduced into the grid circuit of tube 144 of the amplifier, as shown in Fig. 6, and results in intensity modulations of the electron beam of cathode ray oscillograph 52. Pulses 217 of Fig. 7 appear in the output of vacuum tube 144. Since the pulses occur at quarterly intervals during the total interval between transmitted pulses, calibration marks will appear on the cathode ray tube target at quarterly intervals along its radii and as the ray rotates, these marks will trace concentric circular calibrating marks of the type desired as above described. The overall phase shift of the harmonic producing circuit must, obviously, be adjusted so that the phase relations indicated by the curves of Fig. 7 are obtained between the quarterly marking pulses and the transmitted pulses i. e. a quarterly pulse must occur simultaneously with each transmitted pulse.

Obviously the two types of calibration marks above described may be employed together as indicated in Fig. 8B, or they may be employed severally, by inserting one single-pole single-throw switch 119 in lead 121 and another 195 in lead 197 and disconnecting the unwanted source from the amplifier as desired. The amplifier of Fig. 6 is, of course, identical with that of Fig. 4.

Numerous modifications of the arrangements of the invention will readily occur to those skilled in the art. The embodiments described in detail are merely illustrative of the application of the principles of the invention. The scope of the invention is defined in the appended claims.

What is claimed is:

1. In a radio exploratory system for marine craft, a highly directive rotating beam antenna, means for rotating said antenna about a vertical axis, a periodic pulse transmitter and a receiver both connecting to said antenna, a cathode ray oscilloscope of the electrostatic deflection type having horizontal and vertical deflecting plates and a control grid, deflecting voltage sources connecting to the deflecting plates of said oscilloscope for causing the ray thereof to scan radially the target thereof and simultaneously to rotate about the center of the target in synchronism with the beam rotation of said antenna, said voltage sources comprising a generating source of sine and cosine wave voltages coupled with said antenna rotating means, a source of saw-tooth wave voltage, and a modulating circuit, the sine wave voltage modulated by the saw-tooth wave voltage being connected across one pair of deflecting plates and the cosine wave voltage modulated by the saw-tooth wave voltage being connected across the other pair of deflecting plates of the cathode ray oscilloscope and circuit connections between the output of said receiver and the control grid of said oscilloscope, whereby the ray of said oscilloscope is modulated in intensity upon the receipt of reflected pulses by said receiver and a visual pattern is obtained upon the target of said oscilloscope, the indications thereon representing the azimuth angles and distances with respect to the antenna as a central reference point of all objects within the area swept by the beam of said antenna, and an armature having a plurality of segments of a particular potential at discrete points thereon, means for rotating said armature in synchronism with the rotation of said directional beam antenna and means electrically connecting with said armature to control the intensity modulation of said beam to produce calibration radii at predetermined angles on the cathode ray oscilloscope target.

2. In a radio exploratory system for marine craft, a highly directive rotating beam antenna, means for rotating said antenna about a vertical axis, a periodic pulse transmitter and a receiver both connecting to said antenna, a cathode ray oscilloscope of the electrostatic deflection type having horizontal and vertical deflecting plates and a control grid, deflecting voltage sources connecting to the deflecting plates of said oscilloscope for causing the ray thereof to scan radially the target thereof and simultaneously to rotate about the center of the target in synchronism with the beam rotation of said antenna, said voltage sources comprising a generating source of sine and cosine wave voltages coupled with said antenna rotating means, a source of saw-tooth wave voltage, and a modulating circuit, the sine wave voltage modulated by the saw-tooth wave voltage being connected across one pair of deflecting plates and the cosine wave voltage modulated by the saw-tooth wave voltage being connected across the other pair of deflecting plates of the cathode ray oscilloscope and circuit connections between the output of said receiver and the control grid of said oscilloscope, whereby the ray of said oscilloscope is modulated in intensity upon the receipt of reflected pulses by said receiver and a visual pattern is obtained upon the target of said oscilloscope, the indications thereon representing the azimuth angles and distances with respect to the antenna as a central reference point of all objects within the area swept by the beam of said antenna, and means for generating a sequence of pulses having a periodicity which is an even, or aliquot, part of the periodicity of the transmitted pulses and means controlled by said first-mentioned sequence of pulses for intensity modulating the electron beam of the cathode ray oscilloscope whereby a series of regularly spaced concentric circular calibration marks are provided on the target of the cathode ray oscilloscope.

3. A plan position indicating system comprising a rotatable beam antenna, a transmitter, a receiver, a duplexing circuit interconnecting said antenna with said transmitter and with said receiver, a cathode ray indicator having two pairs of deflecting plates in quadrature relation and a control anode, a source of sine wave voltage, a source of saw-tooth wave voltage, means for rotating said antenna, means for synchronizing said sine wave voltage with the rotation of said antenna, means for synchronizing said saw-tooth wave voltage with the emission of energy by said transmitter, means for combining said sine wave and saw-tooth voltages to provide a sine wave voltage and a cosine wave voltage each modulated by said saw-tooth wave voltage, leads connecting one pair of deflecting plates of said cathode ray indicator and said combining circuit to impress the modulated sine wave voltage thereon, leads connecting the other pair of deflecting plates of said cathode ray indicator and said combining circuit to impress the modulated cosine wave voltage thereon and leads connecting said control anode of said cathode ray indicator to said receiver to amplitude modulate the electron beam of said cathode ray indicator upon the receipt of reflected wave energy whereby a plan position indication of amplitude modulations is obtained, the position of each indication directly indicating the azimuth angle and distance of a particular reflecting object with respect to said antenna, and an amplitude controlling amplifier connected to the control anode of said cathode ray indicator, a commutator having grounded segments at regular intervals around its periphery, a brush riding on said commutator and a conductor connecting said brush to the said amplitude controlling amplifier whereby the grounding of said brush by contact with a grounded segment of said commutator causes the electron beam of said cathode ray indicator to trace a radial line at a particular angle on the target of the indicator and means for rotating said commutator in synchronism with the rotation of said antenna whereby a plurality of radial lines at particular predetermined angles are provided on the target of said cathode ray indicator.

4. A plan position indicating system comprising a rotatable beam antenna, a transmitter, a receiver, a duplexing circuit interconnecting said antenna with said transmitter and with said receiver, a cathode ray indicator having two pairs of deflecting plates in quadrature relation and a control anode, a source of sine wave voltage, a source of saw-tooth wave voltage, means for rotating said antenna, means for synchronizing said sine wave voltage with the rotation of said antenna, means for synchronizing said saw-tooth wave voltage with the emission of energy by said transmitter, means for combining said sine wave and saw-tooth voltages to provide a sine wave voltage and a cosine wave voltage each modulated by said saw-tooth wave voltage, leads connecting one pair of deflecting plates of said cathode ray indicator and said combining circuit to impress the modulated sine wave voltage thereon, leads connecting the other pair of deflecting plates of said cathode ray indicator and said combining circuit to impress the modulated cosine wave voltage thereon and leads connecting said control anode of said cathode ray indicator to said receiver to amplitude modulate the electron beam of said cathode ray indicator upon the receipt of reflected wave energy whereby a plan position indication of amplitude modulations is obtained, the position of each indication directly indicating the azimuth angle and distance of a particular reflecting object with respect to said antenna, and an amplitude controlling amplifier connected to the control anode of said cathode ray indicator, a harmonic producer loosely coupled with said transmitter, a filter for selecting a particular harmonic of the harmonic producer output, an impulse coil energized by the selected harmonic, means connecting the impulse coil to the said amplitude controlling amplifier to produce amplitude modulations of the electron beam of said cathode ray indicator for each impulse of said coil whereby a plurality of concentric circular calibrating marks, definitely spaced with respect to the radii of the target of said cathode ray indicator are produced on the target and the distance of any particular indication resulting from receipt of reflected wave energy may be more readily estimated.

5. In a radio exploratory system, a highly directive rotating beam antenna, means for rotating said antenna about a vertical axis, a periodic pulse transmitter, a receiver, a duplexing unit connecting both said transmitter and said receiver to said antenna, a cathode ray oscilloscope having two pairs of deflecting plates, horizontal and vertical, respectively, in quadrature relation and a control anode, a source of sine wave voltage, a source of saw-tooth wave voltage, means for rotating said antenna, means for synchronizing said sine wave voltage with the rotation of said antenna, means for synchronizing said saw-tooth wave voltage with the emission of energy by said transmitter, means for combining said sine wave and saw-tooth wave voltages to provide a sine wave voltage and a cosine wave voltage, each modulated by said saw-tooth wave voltage, means for impressing the modulated sine and cosine voltage waves upon the horizontal and vertical deflecting plates of said oscilloscope, respectively, means for impressing the output of said receiver upon the control anode of said oscilloscope, means synchronized with the rotation of said antenna for generating control pulses at predetermined angular positions of said antenna and means for impressing said generated control pulses on said control anode to increase the intensity of the radial sweep traces of said cathode-ray oscilloscope at angular positions of said radial sweep trace corresponding to said predetermined angular positions of said antenna.

NEWTON W. BRYANT.

REFERENCES CITED

The following references are of record in the file of this patent:

UNITED STATES PATENTS

| Number | Name | Date |
| --- | --- | --- |
| 2,189,549 | Hershberger | Feb. 6, 1940 |
| 2,231,929 | Lyman | Feb. 18, 1941 |
| 2,241,809 | De Forest | May 13, 1941 |
| 2,313,966 | Poch | Mar. 16, 1943 |
| 2,395,966 | Goldberg | Mar. 5, 1946 |

FOREIGN PATENTS

| Number | Country | Date |
| --- | --- | --- |
| 812,975 | France | Feb. 15, 1937 |
| 108,556 | Australia | Sept. 14, 1939 |
| 820,350 | France | July 26, 1937 |